(12) United States Patent
Li et al.

(10) Patent No.: US 9,743,243 B1
(45) Date of Patent: Aug. 22, 2017

(54) LOCATION CONTEXT INFERENCE BASED ON USER MOBILE DATA WITH UNCERTAINTY

(71) Applicant: INTERNATIONAL BUSINESS MACHINES CORPORATION, Armonk, NY (US)

(72) Inventors: Hongfei Li, Briarcliff Manor, NY (US); Anshul Sheopuri, Teaneck, NJ (US); Jinfeng Yi, Ossining, NY (US); Qi Yu, Los Angeles, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/071,996

(22) Filed: Mar. 16, 2016

(51) Int. Cl.
*H04W 24/00* (2009.01)
*H04W 4/02* (2009.01)
*H04W 4/08* (2009.01)
*H04M 1/725* (2006.01)
*H04W 64/00* (2009.01)

(52) U.S. Cl.
CPC ....... *H04W 4/023* (2013.01); *H04M 1/72522* (2013.01); *H04W 4/02* (2013.01); *H04W 4/08* (2013.01); *H04W 64/00* (2013.01)

(58) Field of Classification Search
CPC ......... H04W 4/023; H04W 4/08; H04W 4/02; H04W 64/00; H04M 1/72522
USPC ...................... 455/456.2, 456.5, 456.6, 456.1
See application file for complete search history.

(56) References Cited

U.S. PATENT DOCUMENTS

| | | | |
|---|---|---|---|
| 9,154,915 B2 * | 10/2015 | Fabrikant | H04W 4/023 |
| 9,189,551 B2 | 11/2015 | Goodson et al. | |
| 2003/0126100 A1 * | 7/2003 | Chithambaram | G06N 5/048 706/8 |
| 2006/0149684 A1 | 7/2006 | Matsuura et al. | |
| 2012/0209799 A1 * | 8/2012 | Ohama | G06K 9/00335 706/20 |

(Continued)

FOREIGN PATENT DOCUMENTS

| | | |
|---|---|---|
| CN | 10458409 A | 4/2015 |
| WO | 2007101107 | 9/2007 |

(Continued)

OTHER PUBLICATIONS

David Jurgens, "That's What Friends Are for: Inferring Location in Online Social Media Platforms Based on Social Relationships", Proceedings of the Seventh International AAAI Conference on Weblogs and Social Media, Jun. 2013, pp. 273-282.

(Continued)

*Primary Examiner* — Khai M Nguyen
(74) *Attorney, Agent, or Firm* — Tutunjian & Bitetto, P.C.; Alexa Ashworth

(57) ABSTRACT

Methods and a system are provided that is performed by a computer server for inferring location context categories for a set of mobile users having at least two members. A method includes, for each mobile user in the set, obtaining at least one location context category therefor from publically available information responsive to uncertain mobile device location data. The method further includes applying multi-user collaborative machine learning to the at least one location context category for each mobile user in the set to infer a single refined location context category for each mobile user in the set.

20 Claims, 8 Drawing Sheets

(56) References Cited

U.S. PATENT DOCUMENTS

| | | |
|---|---|---|
| 2012/0220308 A1 | 8/2012 | Ledlie |
| 2014/0067901 A1 | 3/2014 | Shaw et al. |
| 2014/0213294 A1* | 7/2014 | Marti .................... G01S 5/0252 |
| | | 455/456.2 |
| 2014/0304212 A1* | 10/2014 | Shim ........................ G06N 5/04 |
| | | 706/52 |
| 2015/0248436 A1 | 9/2015 | Podemsky et al. |
| 2015/0373493 A1 | 12/2015 | Chowdhury et al. |

FOREIGN PATENT DOCUMENTS

| | | |
|---|---|---|
| WO | 2012131744 A1 | 10/2012 |
| WO | 2015099194 A1 | 7/2015 |

OTHER PUBLICATIONS

Yoshida, et al., "Transfer Learning for Multiple-Domain Sentiment Analysis—Identifying Domain Dependent/Independent Word Polarity", Proceedings of the Twenty-Fifth AAAI Conference on Artificial Intelligence, Aug. 2011 pp. 1286-1291.

Zou, Han et al. A Fast and Precise Indoor Localization Algorithm Based on an Online Sequential Extreme Learning Machine Sensors, Jan. 2015.

Mascharka, David et al. Machine Learning for Indoor Localization Using Mobile Phone-Based Sensors, May 2015.

International Search Report for PCT/IB2017/050952 dated May 31, 2017.

* cited by examiner

| Matrix A | | | | | | | |
|---|---|---|---|---|---|---|---|
| $c_m$ | 0 | 0 | 0 | 0 | | 0 |
| ... | | | | | | |
| $c_6$ | 0 | 0 | 0 | 0 | | 0 |
| $c_5$ | 0 | 0 | 0 | 1 | | 0 |
| $c_4$ | 0 | 1 | 0 | 0 | | 0 |
| $c_3$ | 1 | 0 | 1 | 0 | | 0 |
| $c_2$ | 0 | 0 | 0 | 0 | | 0 |
| $c_1$ | 0 | 0 | 0 | 0 | | 1 |
| | $u_1$ | $u_2$ | $u_3$ | $u_4$ | ... | $u_n$ |

FIG. 5

LOCATION CONTEXT INFERENCE BASED ON USER MOBILE DATA WITH UNCERTAINTY

BACKGROUND

Technical Field

The present invention generally relates to mobile communication, and more particularly to location context inference based on user mobile data with uncertainty.

Description of the Related Art

It is valuable to infer customers' behaviors and intentions using their mobility information. However, significant challenges exist in inferring such information. For example, cell phone data provides longitude and latitude without context. Moreover, cell phone locators are known to not be too accurate. For example, depending on the devices, operating system, and the locating methods, the errors incurred by such cell phone locators can be a hundred meters or more. Thus, there is a need for accurately inferring a location context of a mobile user based on user mobile data that is uncertain.

SUMMARY

According to an aspect of the present principles, a method is provided that is performed by a computer server for inferring location context categories for a set of mobile users having at least two members. The method includes, for each mobile user in the set, obtaining at least one location context category therefor from publically available information responsive to uncertain mobile device location data. The method further includes applying multi-user collaborative machine learning to the at least one location context category for each mobile user in the set to infer a single refined location context category for each mobile user in the set.

According to another aspect of the present principles, a method is provided that is performed by a computer server for inferring location context categories for a set of mobile users having at least two members. The method incudes, for each mobile user in the set, sending a respective query to one or more mobile web applications that return at least one location context category applicable to a submitting one of the mobile users responsive to a mobile user location input specified in the respective query. The method further includes, for each mobile user in the set, receiving the at least one location context category from the mobile web application responsive to the respective query. The method also includes applying multi-user collaborative machine learning to the at least one location context category for each mobile user in the set to infer a single refined location context category for each mobile user in the set.

According to yet another aspect of the present principles, a system is provided for inferring location context categories for a set of mobile users having at least two members. The system includes a computer server, having a processor and a memory, configured to, for each mobile user in the set, obtain at least one location context category therefor from publically available information responsive to uncertain mobile device location data. The computer server, having the processor and the memory, is further configured to apply multi-user collaborative machine learning to the at least one location context category for each mobile user in the set to infer a single refined location context category for each mobile user in the set.

These and other features and advantages will become apparent from the following detailed description of illustrative embodiments thereof, which is to be read in connection with the accompanying drawings.

BRIEF DESCRIPTION OF THE SEVERAL VIEWS OF THE DRAWINGS

The disclosure will provide details in the following description of preferred embodiments with reference to the following figures wherein:

FIG. 5 shows a matrix X that species a single location context category at any given time for each of the n users;

DETAILED DESCRIPTION

Figure 1:
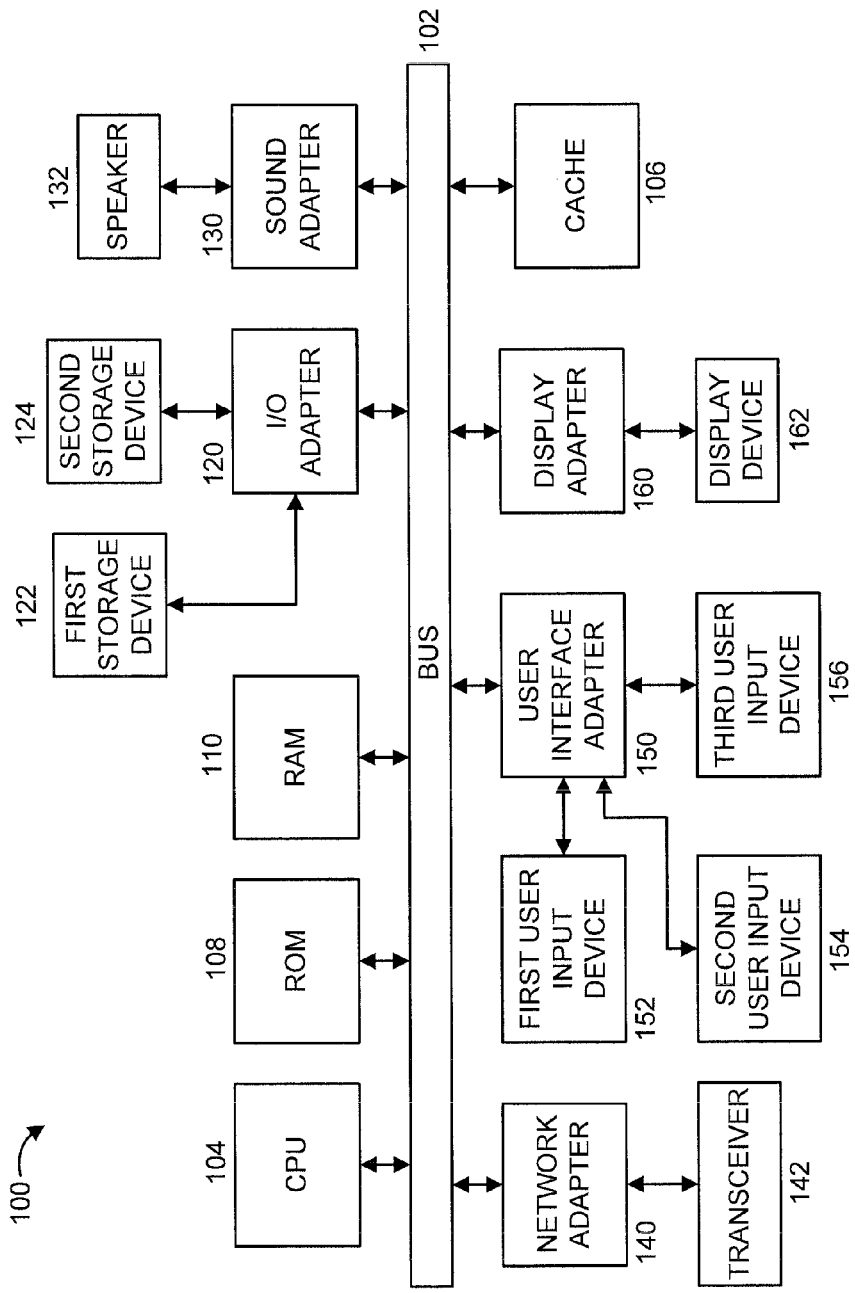
FIG. 1 shows an exemplary processing system to which the present principles may be applied, in accordance with an embodiment of the present principles.

The present principles are directed to inferring location context of a mobile user based on user mobile data that is uncertain. As used herein, the terms "true location category", "refined location category", "true location context category", and "refined location context category" all refer to a presumably more accurate location category inference than (i) the location provided by a mobile device (e.g., phone) locator, which can have an error of a hundred meters or more and (ii) the location context category provided for a single mobile user that is based on the location provided by a mobile device locator. In this way, a more accurate inference of a user's location is provided that can better serve the user and well as any application that involve the user's location. The location provided by a mobile device (e.g., phone) locator is interchangeably referred to herein as "uncertain mobile device location data", as its accuracy is not guaranteed and has the aforementioned typical error, thus rendering such location data uncertain. In most cases, such uncertainty can be represented as location data having an error greater thana threshold error amount. Moreover, the general use of the term "true" herein with respect to an aspect of the present principles refers to a presumably more accurate representation of an item than is otherwise provided without the use of the present principles, as will readily be appreciated by one of ordinary skill in the art given the teachings of the present principles provided herein.

In an embodiment, the present principles provide a machine learning-based solution to automatically infer cell phone user location context categories based on possible nearby location categories. In an embodiment, the present principles use all the users' locating information, which is typically not too accurate, to collaboratively and more accurately locate each other's location context categories.

In an embodiment, possible nearby location categories are collected from publicly available information. Such publicly available information can be obtained from, but not limited to, Foursquare®, OpenStreetMap® (OSM), and so forth. It is to be appreciated that the present principles are not limited to solely the preceding mobile applications and, thus, other mobile applications including those not yet available, can be used in accordance with the teachings of the present principles, while maintaining the spirit of the present principles.

Foursquare® is a local search and discovery service mobile application which provides search results for its users. Foursquare® provides recommendations of places to visit that are proximate to a Foursquare® user's current location based on places a user has gone to, things that the user likes as specified as an input to the Foursquare® application, and on the advice of other Foursquare® users that they trust. Upon sending a query that includes a single location, Foursquare® returns multiple nearby context options. Location categories include the following: Food; Shop; Nightlife Spot; School; Outdoors; and so forth.

OpenStreetMap® is a collaborative project for creating a free editable world map. Map data is collected by volunteers that perform ground surveys using items such as, for example, a handheld GPS unit, a tablet, a digital camera, and so forth. The data is then entered into the OpenStreetMap® database. The data can be viewed/accessed using a web browser and so forth.

In an embodiment, the present principles presume that users can be categorized into multiple groups, where the users in the same groups have similar behavior patterns and interests, while the users in different groups have dissimilar behavior patterns and interests. In this way, the present principles can jointly learn the categorizations and users' behavior patterns.

In an embodiment, the present principles take the following as an input: for each user, a list of the user's nearby location categories. In that embodiment, no other information is needed.

In an embodiment, the present principles provide the following as an output: location categories of the users.

FIG. 1 shows an exemplary processing system 100 to which the present principles may be applied, in accordance with an embodiment of the present principles. The processing system 100 includes at least one processor (CPU) 104 operatively coupled to other components via a system bus 102. A cache 106, a Read Only Memory (ROM) 108, a Random Access Memory (RAM) 110, an input/output (I/O) adapter 120, a sound adapter 130, a network adapter 140, a user interface adapter 150, and a display adapter 160, are operatively coupled to the system bus 102.

A first storage device 122 and a second storage device 124 are operatively coupled to system bus 102 by the I/O adapter 120. The storage devices 122 and 124 can be any of a disk storage device (e.g., a magnetic or optical disk storage device), a solid state magnetic device, and so forth. The storage devices 122 and 124 can be the same type of storage device or different types of storage devices.

A speaker 132 is operatively coupled to system bus 102 by the sound adapter 130. A transceiver 142 is operatively coupled to system bus 102 by network adapter 140. A display device 162 is operatively coupled to system bus 102 by display adapter 160.

A first user input device 152, a second user input device 154, and a third user input device 156 are operatively coupled to system bus 102 by user interface adapter 150. The user input devices 152, 154, and 156 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present principles. The user input devices 152, 154, and 156 can be the same type of user input device or different types of user input devices. The user input devices 152, 154, and 156 are used to input and output information to and from system 100.

Of course, the processing system 100 may also include other elements (not shown), as readily contemplated by one of skill in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 100 are readily contemplated by one of ordinary skill in the art given the teachings of the present principles provided herein.

Figure 2:
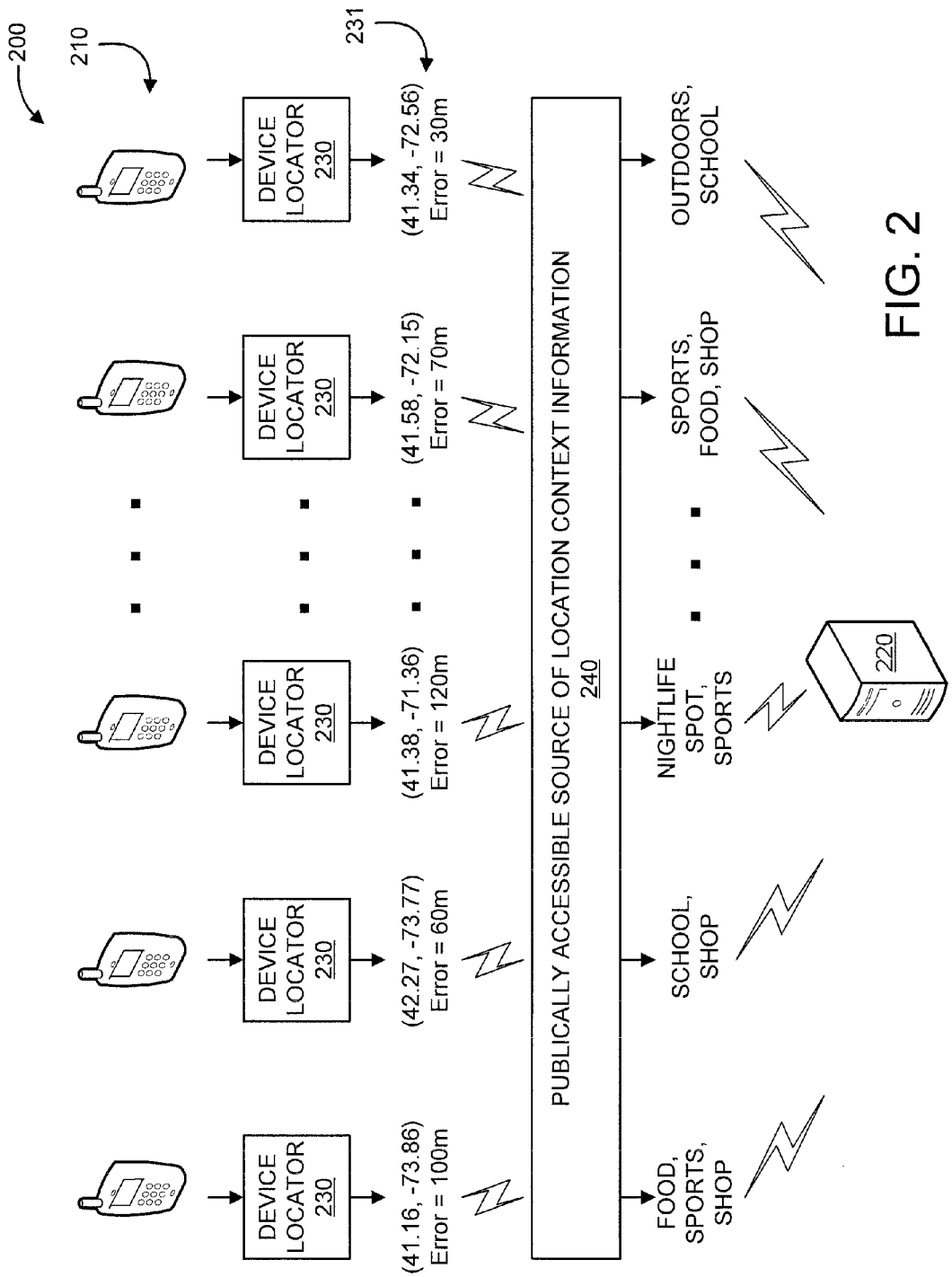
FIG. 2 shows an exemplary environment to which the present principles can be applied, in accordance with an embodiment of the present principles.

FIG. 2 shows an exemplary environment 200 to which the present principles can be applied, in accordance with an embodiment of the present principles.

The environment 200 includes a set of mobile devices 210 and a central server 220. In the embodiment of FIG. 2, the mobile devices are cellular phones. However, it is to be appreciated that any mobile device having a device locator and/or capable of being located by a device locator can be used in accordance with the teachings of the present principles, while maintaining the spirit of the present principles.

In an embodiment, the central server 220 is implemented in the cloud. However, the central server 220 can also be implemented in non-cloud environments.

One or more mobile device locators 230 provide location data 231 for the mobile devices 210. While shown separate from the mobile devices 210 in the embodiment of FIG. 2, the device locators can be within the mobile devices 210 themselves or within or part of other devices/systems, as readily appreciated by one of ordinary skill in the art. Thus, in an embodiment, the mobile user location input can be obtained from the mobile device itself, noting that in most cases such information from the mobile device suffers from what can in most cases be an unacceptable degree of inaccuracy. Such inaccuracy is also typically inherent in device locators on related devices (e.g., from the same manufacturer, such as a phone and a tablet that are each configured to be able to locate the other, and so forth) that have a location determining capability a different device than that providing the location information. The present principles are not limited to any particular device locators and can, thus, be used with Global Positioning System (GPS) based device locators, WIFI Positioning Systems (WPS), cellular network based positioning systems, and so forth. The preceding listing is merely illustrative.

The location data from the mobile device locators 230 is provided to one or more publically accessible sources of location context information (implementing using, e.g., mobile applications, etc.) 240 that return multiple location context categories/options (hereinafter "categories") applicable to a mobile user responsive to a mobile user location input specified in the respective query.

The central server 220 receives the multiple location context categories for a set of mobile device users from the one or more sources 240, and applies machine learning to the multiple location context categories so as to form one or more matrices that each include a set of users and a set of location context categories for the set of users. Exemplary matrices are shown and described with respect to FIG. 4. The machine learning involves the use of an objective function to learn the true location of a mobile device user from what was initially somewhat inaccurate location data from the mobile device locator. To that end, the central server 220 will identify a single true location context category for each user from the multiple location context categories received for each user.

The central server 220 can then perform one or more functions and/or implement one or more applications based on the true location of the mobile device users.

Figure 3:
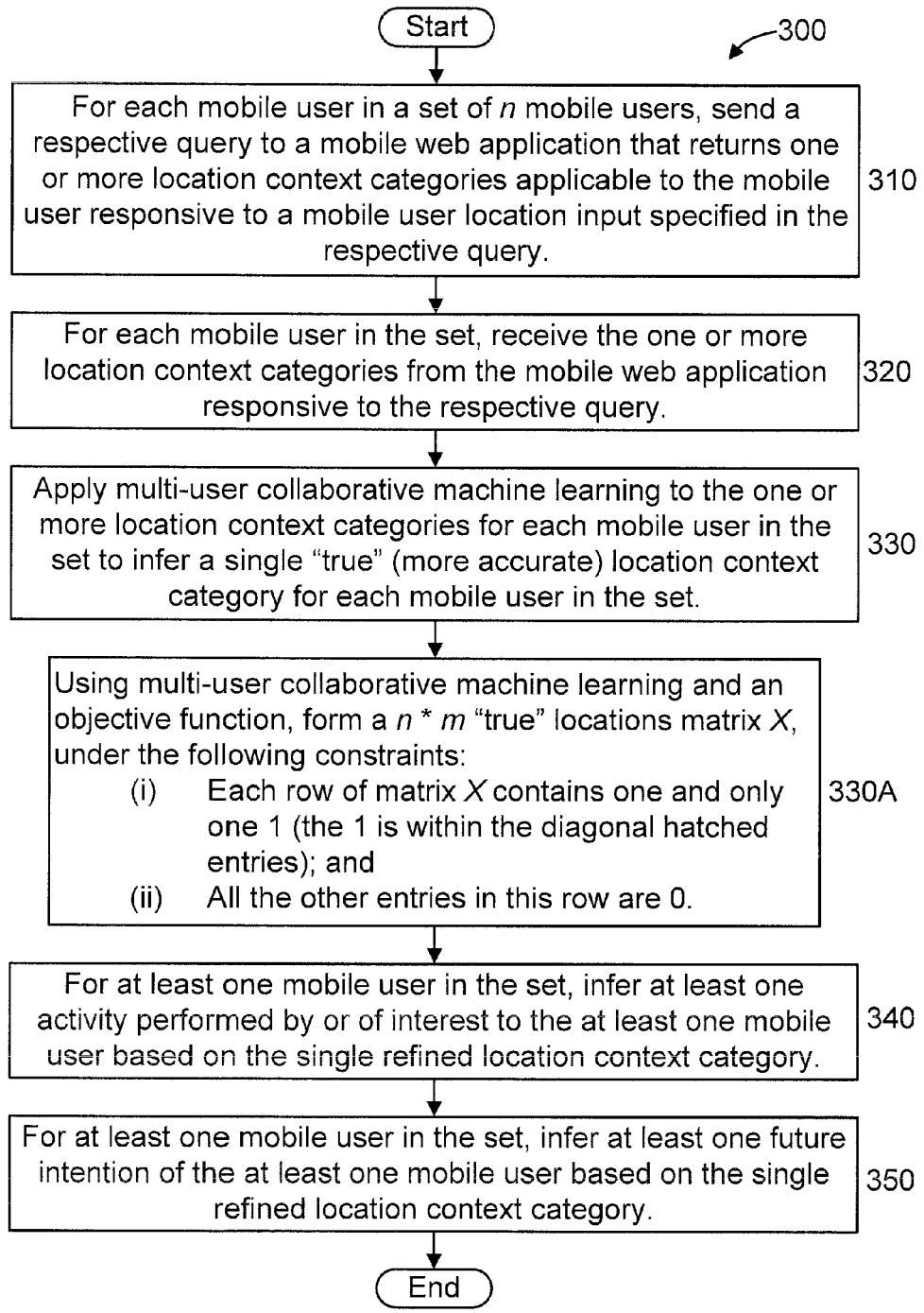
FIG. 3 shows an exemplary method for inferring mobile user location context based on user mobile data that is uncertain, in accordance with an embodiment of the present principles.

FIG. 3 shows an exemplary method for inferring mobile user location context based on user mobile data that is uncertain, in accordance with an embodiment of the present principles.

In the embodiment of FIG. 3, the method 300 is utilized for n users, and m location context categories for the sake of illustration. However, it is to be appreciated that the present principles can be utilized for any number of users and any number of location context categories, which can be readily varied based on the implementation, as readily appreciated by one of ordinary skill in the art given the teachings of the present principles provided herein, while maintaining the spirit of the present principles.

Figure 4:
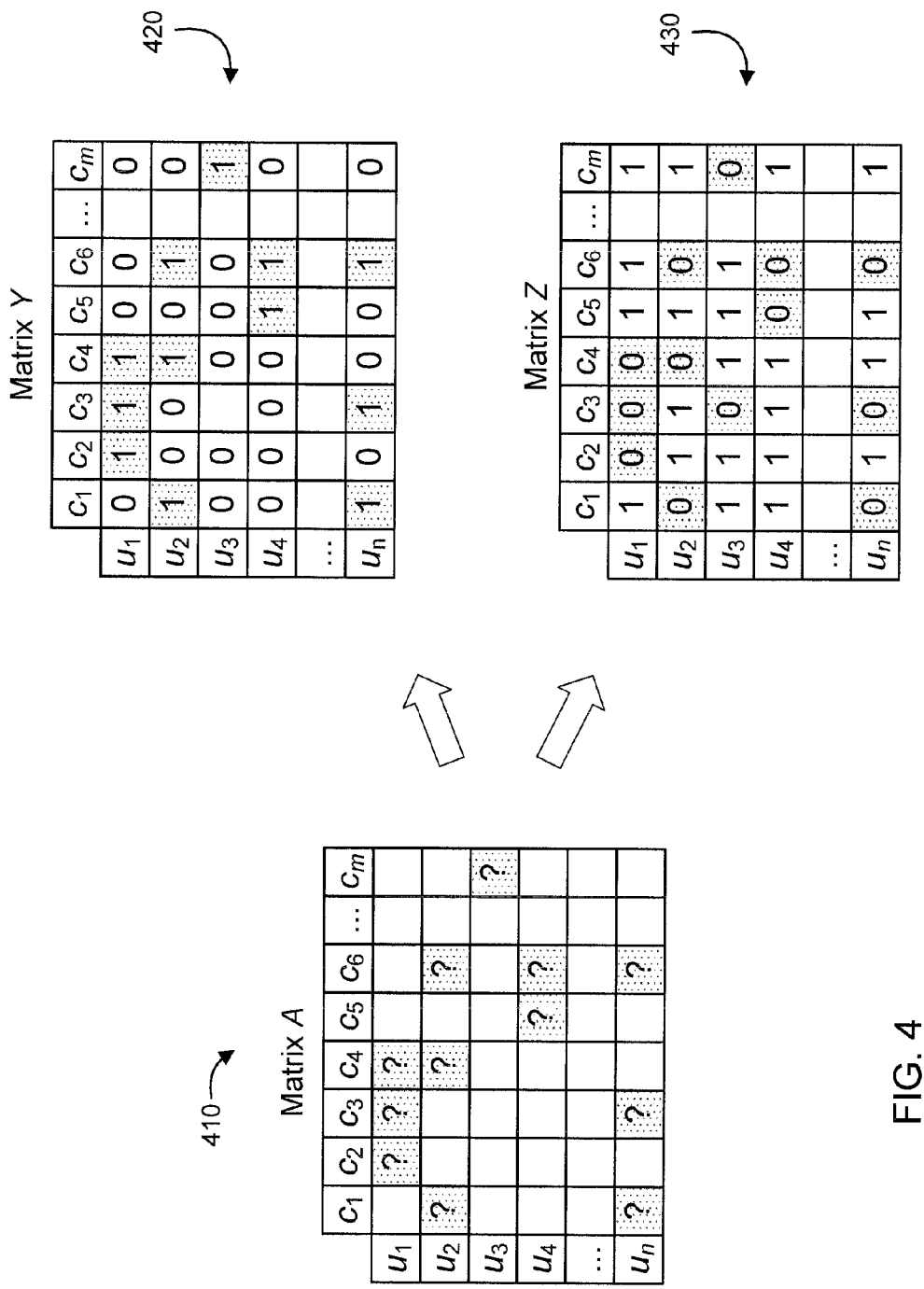
FIG. 4 shows a matrix A, a possible location binary matrix Y, and an impossible location binary matrix Z, in accordance with an embodiment of the present principles.

In the embodiment of FIG. 3, the method 300 operates under certain constraints and presumptions. For example, as a constraint, for each given time period under consideration, each user must belong to one and only one category. Initially, the category is unknown, but a set exists that includes all categories of interest. In an embodiment, the set is a list of users and the users' nearby location categories. As an example, FIG. 4 shows a matrix A 410 of all (n) users and all (m) categories, from which are derived a possible location binary matrix Y 420 and an impossible location binary matrix Z 430, in accordance with an embodiment of the present principles. FIG. 5 shows a matrix X 510 that species a single location context category at any given time for each of the n users. In the matrices (410, 420, 430, 510), nearby location categories are shown using a dotted hatch pattern, while other location categories are shown without any hatch pattern. In each of the matrices (410, 420, 430, 510), the different n users are denoted using $u_1$ through $u_n$, while the different m categories are denoted using $c_1$ through $c_m$. Matrix X 510 is formed as follows:

matrix $X510$=matrix $Y420$+matrix $Z430$.

Referring to FIG. 3, at step 310, for each mobile user in a set of n mobile users, send a respective query to a mobile web application that returns one or more location context categories applicable to the mobile user responsive to a mobile user location input specified in the respective query. The total number of location context categories for all n users is m, wherein n and m are both integers. In an embodiment, the mobile user location input can be obtained from the mobile device itself, noting that in most cases such information from the mobile device suffers from what can in most cases be an unacceptable degree of inaccuracy. The mobile user location input can be in longitude and latitude or in any other representation used to represent a location.

At step 320, for each mobile user in the set, receive the one or more location context categories from the mobile web application responsive to the respective query.

At step 330, apply multi-user collaborative machine learning to the one or more location context categories for each mobile user in the set to infer a single "true" (more accurate) location context category for each mobile user in the set. In the context of the present invention, the term "multi-user collaborative machine learning" refers to machine learning that is applied to data from multiple users so to arrive at a result that is essentially collaborated across the multiple users through their shared data, with such sharing relating to the use of the machine learning being applied to the data of the multiple users. While the following example envisions a single location context category being applicable to a respective mobile user, more than one is possible, for example, if the user is standing in between two establishments, one for food (e.g., a restaurant) and one for sports (e.g., a sporting goods store). However, in most cases, only one category will be invoked. Moreover, the present principles can be constrained to apply to (select) only one category, as in the illustrative embodiments shown herein. These and other variations of the present principles are readily determined by one of ordinary skill in the art given the teachings of the present principles provided herein, while maintaining the spirit of the present principles.

In an embodiment, step 330 includes steps 330A-330X.

At step 330A, using multi-user collaborative machine learning and an objective function, form a n*m "true" locations matrix X, under the following constraints:
 (i) Each row of matrix X 510 contains one and only one
  1 (the 1 is within the diagonal hatched entries); and
 (ii) All the other entries in this row are 0.

In matrix X 510, $X_{ij}=1$ means the user i's true destination is in the location category j.

In an embodiment, the matrix X 510 should be a low-rank matrix. In an embodiment, the rank can be as follows:

rank($X$)=number of user groups($\ll n$)

In an embodiment, the objective function is as follows:

$$\min_{X \in \{0,1\}^{n \times m}} \quad \|X\|_*$$
$$\text{s.t.} \quad X_{i,*} Y_{i,*}^T = 1, \forall i \in [n]$$
$$X_{i,*} Z_{i,*}^T = 0, \forall i \in [n]$$

where $\|X\|_*$ denotes the nuclear norm of the matrix X 510 (the nuclear norm is the convex envelope of the non-convex rank function), and $X\{i,*\}$ denotes the i-th row vector of matrix X 510.

It is to be appreciated that the two constraints ensure that each row in matrix X 510 contains one and only one 1, and all the other entries are 0.

The above objective function can be efficiently optimized via an augmented Lagrangian method, which is able to replace the constrained optimization problem relating to the objective function by a series of unconstrained problems. Since the objective function is convex, the optimal solution learned by the optimization method is unique and robust to initializations. In addition, since the learned matrix X is sparse (only a single 1 in each row) and of low-rank, it naturally captures a small amount of the most important factors that can drive people's behaviors. This makes it very appealing to model people's behaviors and interest.

At step 340, for at least one mobile user in the set, infer at least one activity performed by or of interest to the at least one mobile user based on the single refined location context category.

At step 350, for at least one mobile user in the set, infer at least one future intention of the at least one mobile user based on the single refined location context category.

A description will now be given regarding various advantages provided by the present principles.

For example, the present principles can advantageously exploit mobile data uncertainties to provide insights on mobile user behaviors and intentions.

More generally, the proposed invention can solve a general assignment uncertainty problem. For example, in browsing data, the system knows the user is interested in at least one of the items on a given page, but may not be sure which particular item is of interest. Advantageously, the present principles can infer a mobile user's true interests.

Further, the identification of the true location context is a necessary step in many applications relating to spatial-temporal analysis.

Also, uncertainty of assignments is a key problem in marketing analysis, to which the present principles can be readily applied to remove or mitigate such uncertainty.

Exemplary applications/uses to which the present principles can be applied include, but are not limited to: targeting advertising; marketing applications; spatio-temporal analysis; and so forth.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 6:
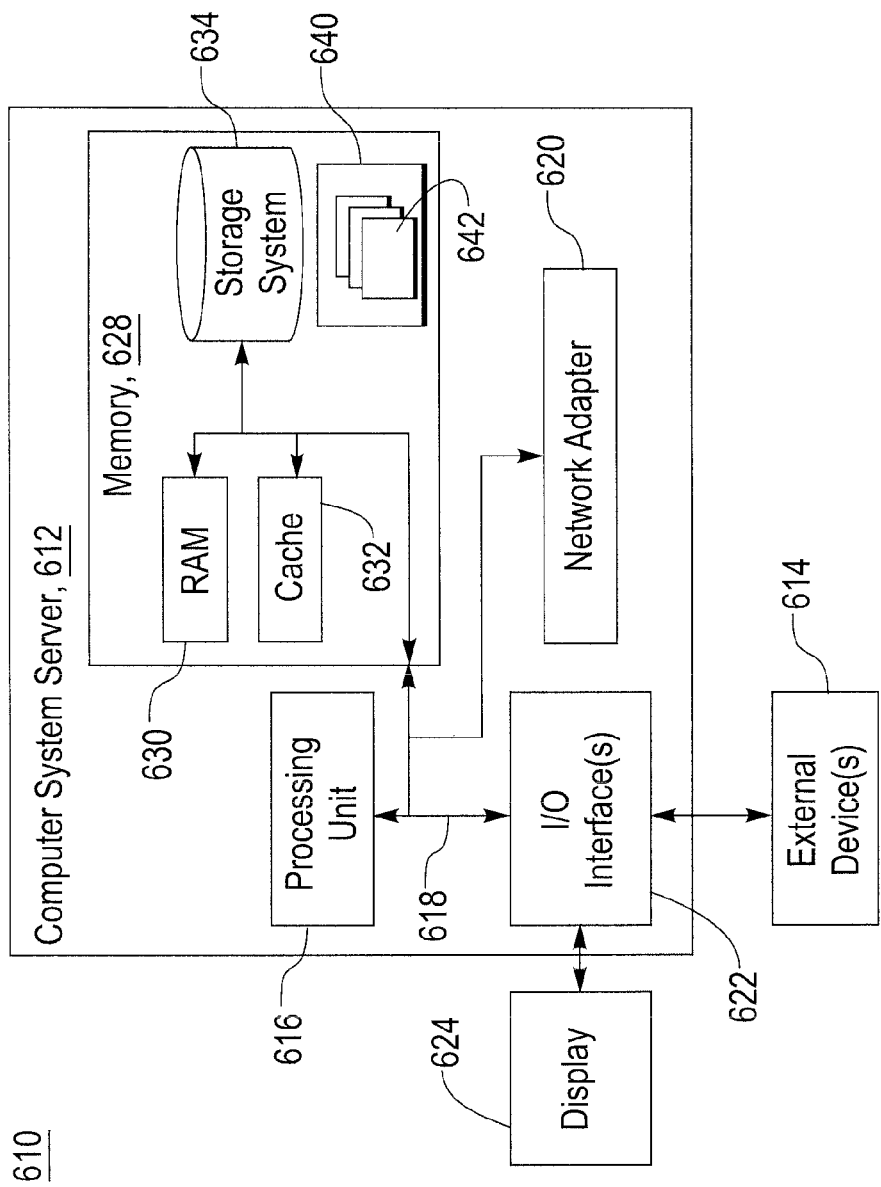
FIG. 6 shows an exemplary cloud computing node, in accordance with an embodiment of the present principles.

Referring now to FIG. 6, a schematic of an example of a cloud computing node 610 is shown. Cloud computing node 610 is only one example of a suitable cloud computing node and is not intended to suggest any limitation as to the scope of use or functionality of embodiments of the invention described herein. Regardless, cloud computing node 610 is capable of being implemented and/or performing any of the functionality set forth hereinabove.

In cloud computing node 610 there is a computer system/server 612, which is operational with numerous other general purpose or special purpose computing system environments or configurations. Examples of well-known computing systems, environments, and/or configurations that may be suitable for use with computer system/server 612 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 612 may be described in the general context of computer system executable instructions, such as program modules, being executed by a computer system. Generally, program modules may include routines, programs, objects, components, logic, data structures, and so on that perform particular tasks or implement particular abstract data types. Computer system/server 612 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 6, computer system/server 612 in cloud computing node 610 is shown in the form of a general-purpose computing device. The components of computer system/server 612 may include, but are not limited to, one or more processors or processing units 616, a system memory 628, and a bus 618 that couples various system components including system memory 628 to processor 616.

Bus 618 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 612 typically includes a variety of computer system readable media. Such media may be any available media that is accessible by computer system/server 612, and it includes both volatile and non-volatile media, removable and non-removable media.

System memory 628 can include computer system readable media in the form of volatile memory, such as random access memory (RAM) 630 and/or cache memory 632. Computer system/server 612 may further include other removable/non-removable, volatile/non-volatile computer system storage media. By way of example only, storage system 634 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 618 by one or more data media interfaces. As will be further depicted and described below, memory 628 may include at least one program product having a set (e.g., at least one) of program modules that are configured to carry out the functions of embodiments of the invention.

Program/utility 640, having a set (at least one) of program modules 642, may be stored in memory 628 by way of example, and not limitation, as well as an operating system, one or more application programs, other program modules, and program data. Each of the operating system, one or more application programs, other program modules, and program data or some combination thereof, may include an implementation of a networking environment. Program modules 642 generally carry out the functions and/or methodologies of embodiments of the invention as described herein.

Computer system/server 612 may also communicate with one or more external devices 614 such as a keyboard, a pointing device, a display 624, etc.; one or more devices that enable a user to interact with computer system/server 612; and/or any devices (e.g., network card, modem, etc.) that enable computer system/server 612 to communicate with one or more other computing devices. Such communication can occur via Input/Output (I/O) interfaces 622. Still yet, computer system/server 612 can communicate with one or more networks such as a local area network (LAN), a general wide area network (WAN), and/or a public network (e.g., the Internet) via network adapter 620. As depicted, network adapter 620 communicates with the other components of computer system/server 612 via bus 618. It should be understood that although not shown, other hardware and/or software components could be used in conjunction with computer system/server 612. Examples, include, but are not limited to: microcode, device drivers, redundant processing units, external disk drive arrays, RAID systems, tape drives, and data archival storage systems, etc.

Figure 7:
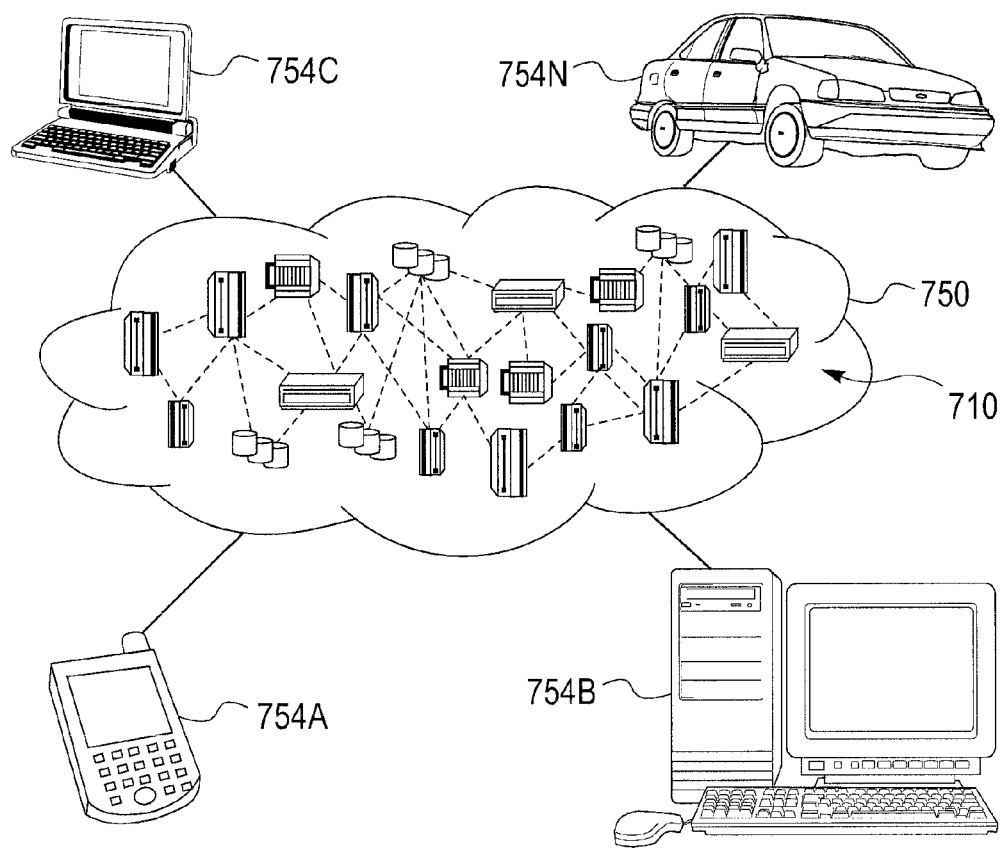
FIG. 7 shows an exemplary cloud computing environment, in accordance with an embodiment of the present principles.

Referring now to FIG. 7, illustrative cloud computing environment 750 is depicted. As shown, cloud computing environment 750 comprises one or more cloud computing nodes 710 with which local computing devices used by cloud consumers, such as, for example, personal digital assistant (PDA) or cellular telephone 754A, desktop computer 754B, laptop computer 754C, and/or automobile computer system 754N may communicate. Nodes 710 may communicate with one another. They may be grouped (not shown) physically or virtually, in one or more networks, such as Private, Community, Public, or Hybrid clouds as described hereinabove, or a combination thereof. This allows cloud computing environment 750 to offer infrastructure, platforms and/or software as services for which a cloud consumer does not need to maintain resources on a local computing device. It is understood that the types of computing devices 754A-N shown in FIG. 7 are intended to be illustrative only and that computing nodes 710 and cloud computing environment 750 can communicate with any type of computerized device over any type of network and/or network addressable connection (e.g., using a web browser).

Figure 8:
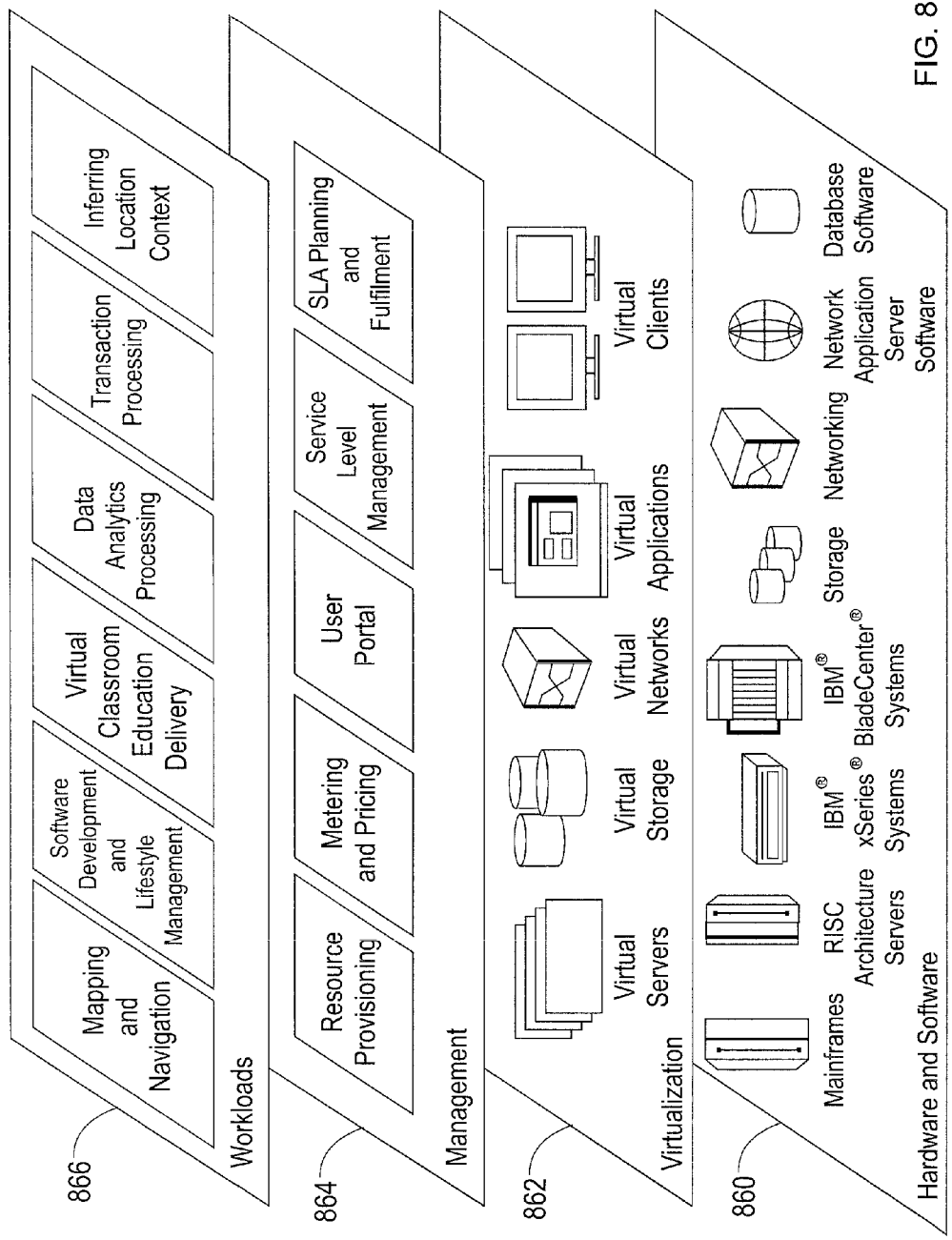
FIG. 8 shows exemplary abstraction model layers, in accordance with an embodiment of the present principles.

Referring now to FIG. 8, a set of functional abstraction layers provided by cloud computing environment 750 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 860 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 862 provides an abstraction layer from which the following examples of virtual entities may be provided: virtual servers; virtual storage; virtual networks, including virtual private networks; virtual applications and operating systems; and virtual clients.

In one example, management layer 864 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 866 provides examples of functionality for which the cloud computing environment may be utilized. Examples of workloads and functions which may be provided from this layer include: mapping and navigation; software development and lifecycle management; virtual classroom education delivery; data analytics processing; transaction processing; and inferring location context.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A method performed by a computer server for inferring location context categories for a set of mobile users having at least two members, comprising:

for each mobile user in the set, obtaining at least one location context category therefor from publically available information responsive to uncertain mobile device location data; and applying multi-user collaborative machine learning with an objective function to the at least one location context category for each mobile user in the set to infer a single refined location context category for each mobile user in the set to form a matrix.

2. The method of claim 1, wherein the uncertain mobile device location data comprises cellular telephone location data generated by a cellular telephone locator.

3. The method of claim 1, wherein said obtaining step comprises:

for each mobile user in the set, sending a respective query to one or more mobile web applications that return the at least one location context category applicable to a submitting one of the mobile users responsive to the uncertain mobile device location data specified in the respective query; and for each mobile user in the set, receiving the at least one location context category from the mobile web application responsive to the respective query.

4. The method of claim 1, further comprising categorizing the mobile users into multiple groups based on similarities between the mobile users.

5. The method of claim 1, wherein the multi-user collaborative machine learning is performed using an objective function expressed using a nuclear norm.

6. The method of claim 1, wherein said matrix has each one of columns and rows correspond to a respective one of the mobile users, and each of the other one of the columns and the rows correspond to a respective one of the multiple location context categories.

7. The method of claim 1, wherein the objective function is expressed using a convex envelope of a non-convex rank function subject to a row constraint on the matrix.

8. The method of claim 1, further comprising, for at least one mobile user in the set, inferring at least one activity performed by or of interest to the at least one mobile user based on the single refined location context category.

9. The method of claim 1, further comprising, for at least one mobile user in the set, inferring at least one future intention of the at least one mobile user based on the single refined location context category.

10. A non-transitory article of manufacture tangibly embodying a computer readable program which when executed causes a computer to perform the steps of claim 1.

11. A method performed by a computer server for inferring location context categories for a set of mobile users having at least two members, comprising:

for each mobile user in the set, sending a respective query to one or more mobile web applications that return at least one location context category applicable to a submitting one of the mobile users responsive to a mobile user location input specified in the respective query;

for each mobile user in the set, receiving the at least one location context category from the mobile web application responsive to the respective query; and applying multi-user collaborative machine learning with an objective function to the at least one location context category for each mobile user in the set to infer a single refined location context category for each mobile user in the set to form a matrix.

12. The method of claim 11, wherein at least one of the one or more mobile web applications at least one of use or provide publically available location context category information.

13. The method of claim 11, further comprising categorizing the mobile users into multiple groups based on similarities between the mobile users.

14. The method of claim 11, further comprising, for at least one mobile user in the set, inferring at least one activity performed by or of interest to the at least one mobile user based on the single refined location context category.

15. The method of claim 11, further comprising, for at least one mobile user in the set, inferring at least one future intention of the at least one mobile user based on the single refined location context category.

16. A non-transitory article of manufacture tangibly embodying a computer readable program which when executed causes a computer to perform the steps of claim 11.

17. A system for inferring location context categories for a set of mobile users having at least two members, comprising:

a computer server, having a processor and a memory, configured to:
for each mobile user in the set, obtain at least one location context category therefor from publically available information responsive to uncertain mobile device location data; and
apply multi-user collaborative machine learning with an objective function to the at least one location context category for each mobile user in the set to infer a single refined location context category for each mobile user in the set to form a matrix.

18. The system of claim 17, wherein the computer server is implemented using a cloud computing configuration.

19. The system of claim 17, wherein the computer server is further configured to, for at least one mobile user in the set, infer at least one activity performed by or of interest to the at least one mobile user based on the single refined location context category.

20. The system of claim 17, wherein the computer server is further configured to, for at least one mobile user in the set, infer at least one future intention of the at least one mobile user based on the single refined location context category.

* * * * *